US006994460B2

(12) United States Patent
Yamamura

(10) Patent No.: US 6,994,460 B2
(45) Date of Patent: Feb. 7, 2006

(54) VEHICULAR HEADLAMP

(75) Inventor: Satoshi Yamamura, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 95 days.

(21) Appl. No.: 10/678,544

(22) Filed: Oct. 3, 2003

(65) Prior Publication Data

US 2004/0114390 A1 Jun. 17, 2004

(30) Foreign Application Priority Data

Oct. 7, 2002 (JP) .......................... P.2002-293213

(51) Int. Cl.
*B60Q 1/044* (2006.01)

(52) U.S. Cl. ...................... 362/539; 362/538; 362/460; 362/464

(58) Field of Classification Search ................ 362/538, 362/539, 507, 508, 233, 372, 287, 298–300
See application file for complete search history.

(56) References Cited

U.S. PATENT DOCUMENTS 1,598,044 A * 8/1926 Bone .......................... 362/308
1,721,611 A 7/1929 Webster
1,835,745 A * 12/1931 Barbian ...................... 362/300
4,677,532 A * 6/1987 Peitz et al. ................. 362/539
4,811,174 A * 3/1989 Kanzler et al. ............. 362/538
4,851,968 A * 7/1989 Nino .......................... 362/539
5,055,981 A * 10/1991 Nino .......................... 362/539
5,283,719 A * 2/1994 Sekiguchi ................... 362/548
6,332,702 B1 12/2001 Hebler et al.
6,742,920 B2 * 6/2004 Takada et al. .............. 362/539
2004/0114390 A1 6/2004 Yamamura

FOREIGN PATENT DOCUMENTS

AT 406 079 2/2000
EP 0 212 211 3/1987
FR 2 849 159 6/2004
GB 1 193 983 6/1970
JP 2-47704 4/1990
JP 2001-006408 1/2001
JP 2002-170409 6/2002

* cited by examiner

*Primary Examiner*—Stephen Husar
*Assistant Examiner*—Hargobind S. Sawhney
(74) *Attorney, Agent, or Firm*—Koda & Androlia

(57) ABSTRACT

A vehicular headlamp that forms a predetermined light distribution pattern in front of the lamp by light that is radiated from a projector-type lamp unit. The projector-type lamp unit includes a projection lens provided on the optical axis that extends in the longitudinal direction of a vehicle and passes through substantially the center of the projection lens, a light source bulb provided behind the rear focal point of the projection lens, and a reflector which condenses and reflects light from the light source bulb toward the optical axis in the forward direction; and the light source bulb is disposed in the reflector at a point which is at a distance from the optical axis in an obliquely downward direction.

4 Claims, 7 Drawing Sheets

VEHICULAR HEADLAMP

BACKGROUND OF THE INVENTION

1. Field of the Invention

The present invention relates to a vehicular headlamp having therein a projector-type lamp unit.

2. Prior Art

In a conventionally known vehicular headlamp, a predetermined light distribution pattern is formed by light radiation from a projector-type lamp unit; and this projector-type lamp unit typically includes a projection lens disposed on the optical axis of the lamp that extends in the longitudinal direction of a vehicle, a light source bulb provided behind a rear focal point of the projection lens, and a reflector which condenses and reflects light from the light source bulb toward the optical axis in a forward direction.

Japanese Utility Model Application Publication (Kokoku) No. H2-47704 discloses a vehicular headlamp of this type; and in this headlamp, the light source bulb is fixedly inserted (that is, inserted and fixed) in the reflector from a location that is on one side of the optical axis.

A typical projector-type lamp unit is long in the longitudinal direction due to its structure. Therefore, in a vehicular headlamp that has such a projector-type lamp unit, it is necessary that the lamp body have a sufficient depth dimension in order to ensure accommodation space for the projector-type unit.

For this reason, in the above Japanese Utility Model Application Publication (Kokoku) No. H2-47704, since the light source bulb is fixedly inserted in the reflector from the side of the optical axis, the rearward-projecting amount of the lamp unit is small and its longitudinal length is reduced as well.

However, in this projector-type lamp unit the light source bulb is fixedly inserted in the reflector from the side of the optical axis or from a position that is on a horizontal plane at the same horizontal level as the optical axis, the lamp having such a lamp unit has problems.

In a projector-type lamp unit, the side area, with respect to the optical axis, of the reflecting surface of the reflector is most suitably used for forming a diffusion area of a light distribution pattern. However, if the light source bulb is fixedly inserted in the reflector on the same horizontal plane as the optical axis, the hole for inserting the light source bulb is formed in such side area of the reflecting surface, and as a result, the side area of the optical axis cannot be effectively used for controlling the distribution light. Accordingly, it is difficult to ensure sufficient brightness of the diffusion area of the light distribution pattern.

SUMMARY OF THE INVENTION

The present invention is made in view of the foregoing problems.

The object of the present invention is to provide a vehicular headlamp that includes a projector-type lamp unit which forms a predetermined light distribution pattern; and in the present invention, the brightness of the diffusion area of the light distribution pattern is sufficiently ensured by the projector-type lamp unit that has a reduced longitudinal length.

The present invention accomplishes the object by improving the installation position of the light source bulb.

More specifically, the above object is accomplished by a unique structure of the present invention for a vehicular headlamp that forms a predetermined light distribution pattern by light radiated from a projector-type lamp unit which includes a projection lens provided on the optical axis that extends in the longitudinal direction of a vehicle, a light source bulb provided behind the rear focal point of the projection lens, and a reflector which condenses and reflects light from the light source bulb toward the optical axis in a forward direction; and in the present invention, the light source bulb is fixedly inserted in the reflector from the side of the optical axis in a position separated from the optical axis in the vertical direction or the bulb is fixedly inserted in the reflector from a position that is at a distance oblique to the optical axis.

In the present invention, the “light source bulb” is not limited to a specific type, and it can be a discharge bulb, a halogen lamp, or the like.

In addition, the predetermined light distribution pattern is not limited to a specific light distribution pattern, and it can be a high beam distribution pattern, a low beam distribution pattern, an intermediate light distribution pattern, or the like.

The “position separated from the optical axis in the vertical direction” can be a position that is either in an upward or a downward direction with respect to the optical axis. In addition, there is no particular limitation in regards to the value of the displacement amount in the upward or downward direction.

It is essential that the “horizontal direction perpendicular to the optical axis” is included in the concept of the “side of the optical axis”, but any direction is included in the concept of the side of the optical axis as long as a displacement amount with respect to the horizontal direction perpendicular to the optical axis is within the range of 30 degrees or less.

As seen from the above, in the vehicular headlamp according to the present invention, a predetermined light distribution pattern is formed by light radiation from a projector-type lamp unit, and the light source bulb is fixedly inserted in the reflector from the side (lateral side) of the optical axis of the projection lens in a position separated from the optical axis in the vertical direction. Accordingly, the vehicular headlamp has the following effects:

Since the light source bulb is fixedly inserted in the reflector from the side of the optical axis of the projection lens, the longitudinal length of the lamp unit can be reduced.

In addition, since the light source bulb is fixedly inserted in the reflector at a position that is at a distance from the optical axis of the projection lens in the vertical and lateral directions, a hole that is used for fixedly inserting the light source bulb is prevented from being formed on the side area of the optical axis in the reflecting surface of the reflector. Thus, the side area of the optical axis is effectively used for controlling the distribution light. As a result, it is possible to form a diffusion area of the light distribution pattern by light reflected from the side area of the optical axis, and sufficient brightness is ensured in the diffusion area.

According to the present invention, the vehicular headlamp is configured such that a predetermined light distribution pattern is formed by light radiation from the projector-type lamp unit, and a sufficient brightness in the diffusion area of the light distribution pattern is ensured by a lamp unit that has a reduced longitudinal length.

As described above, the displacement amount of the light source bulb in the vertical direction with respect to the optical axis of the projection lens is not limited to a specific value. However, it is preferable that the displacement amount from the optical axis of the light emitting portion of the light source bulb in the vertical direction is set to 10 mm or more, more preferably to 15 mm or more. With such displacement values, light from the light source bulb that is reflected in the vicinity area of the optical axis on the reflecting surface of the reflector is prevented from being blocked by the light source bulb. On the contrary, in order to ensure that a sufficient light flux is incident from the light source bulb toward the reflecting surface of the reflector, it is preferable that the value of the displacement amount in the vertical direction is set 30 mm or less.

Meanwhile, when the low beam distribution pattern is formed by light radiation from the projector-type lamp unit, a shade is typically provided between the projection lens and the light source bulb. This shade forms a cut-off line at the upper edge of the low beam distribution pattern by way of blocking part of the light reflected from the reflector. In view of this, in the present invention, the light source bulb is fixedly inserted in the reflector from below the optical axis; accordingly, it is possible to sufficiently use the upper reflection area, which is suitable for forming the low beam distribution pattern, on the reflecting surface of the reflector.

In this case, in the present invention, the upper reflection area on the reflecting surface of the reflector is set as a reflection area that forms the diffusion light distribution pattern; accordingly, a sufficient lateral diffusion angle is secured for the low beam light distribution pattern. In addition, the lower central area in the lower reflection area on the reflecting surface of the reflector, in which the light flux of the light source bulb has a relatively large value, is set as a reflection area that forms a condense light distribution pattern, it is possible in the present invention to easily form a hot zone that is an area of high-intensity light in the low beam distribution pattern. The diffusion light distribution pattern means a pattern with a relatively large diffusion angle. The condense light distribution pattern means a pattern with a relatively small diffusion angle.

Furthermore, in the present invention, the light source bulb is inserted in the reflector and fixed so that the light source bulb is upwardly inclined by predetermined angle with respect to the horizontal direction. Accordingly, the hole for fixedly inserting the light source bulb that is formed on the reflecting surface of the reflector can be positionally lowered. As a result, the side area on the optical axis on the reflecting surface is widely used for controlling the light distribution. The above described predetermined angle for the light source bulb is not limited to a specific angle.

DETAILED DESCRIPTION OF THE INVENTION

A description of the embodiments of the present invention will be given below with reference to the accompanying drawings.

Figure 1:
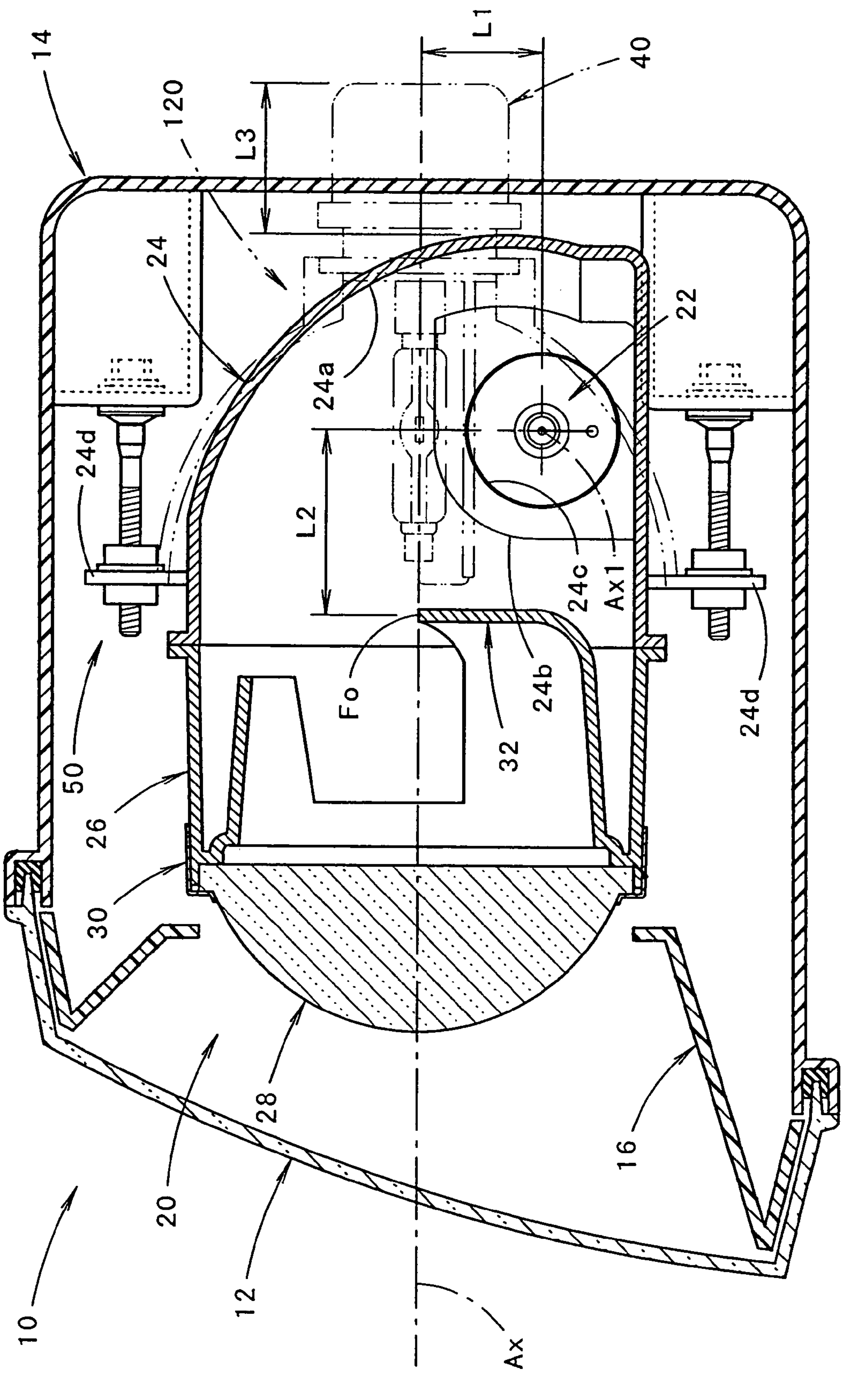
FIG. 1 is a side view of the vehicular headlamp according to the preferred embodiment of the present invention, the headlamp being show in cross section.

As seen from FIG. 1, in the vehicular headlamp 10 of the shown embodiment of present invention, a lamp unit 20 is stored so that it is tiltable in the vertical and horizontal directions via an aiming mechanism 50 in the lamp chamber that is formed by a generally plain translucent cover 12 and a lamp body 14, and an extension reflector 16 is provided at a front end peripheral portion of the lamp unit 20.

Figure 2:
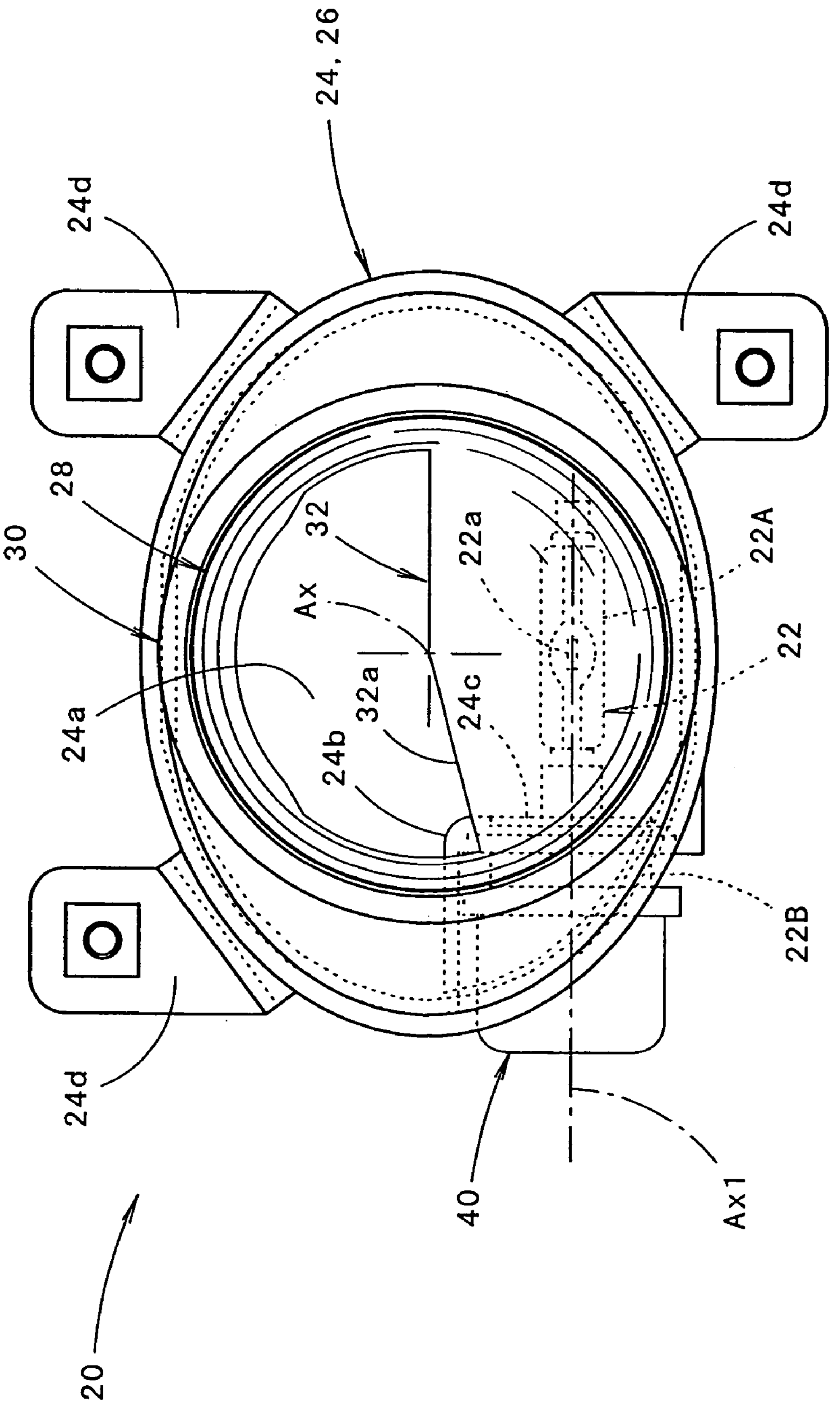
FIG. 2 is a front view of the lamp unit used in the vehicular headlamp of the present invention.
Figure 3:
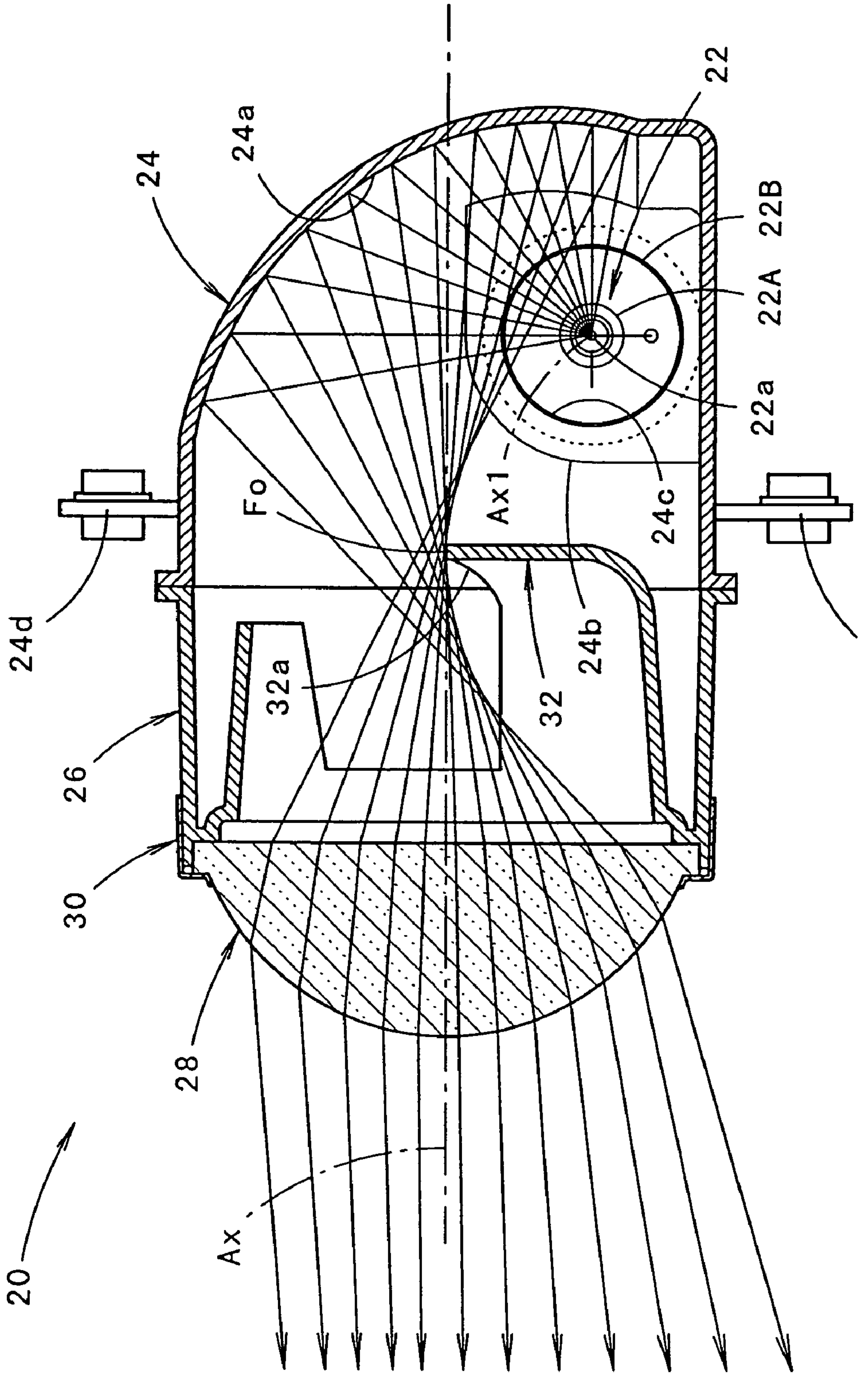
FIG. 3 is side view of the lamp unit shown in cross section.
Figure 4:
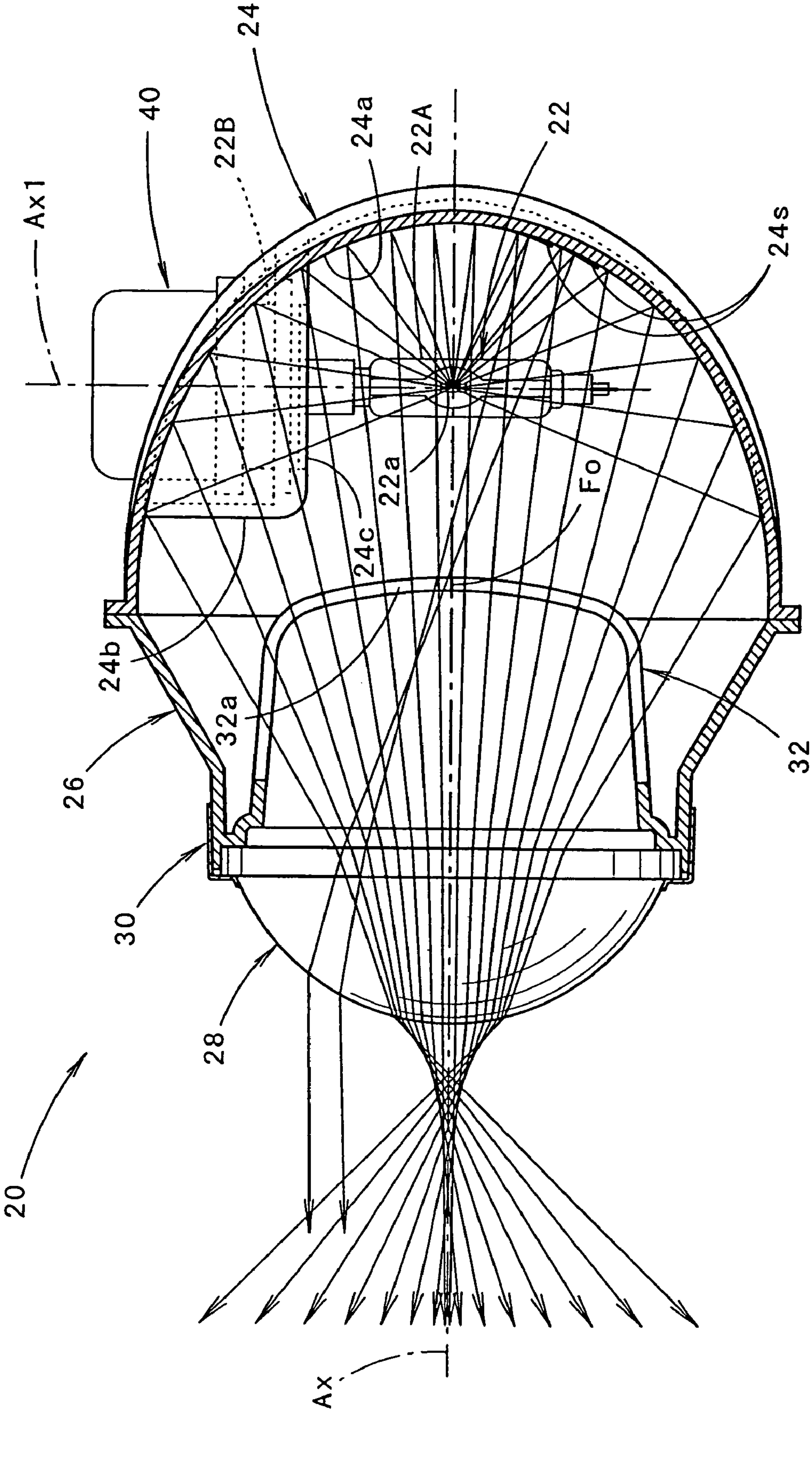
FIG. 4 is top view of the lamp unit shown in cross-section.

The lamp unit 20 is, as shown in FIGS. 2, 3 and 4, a projector-type lamp unit; and it radiates light that forms, in front of the headlamp, a low beam distribution pattern which is described later. The lamp unit 20 includes a discharge bulb 22 as a light source, a reflector 24, a lens holder 26, a projection lens 28, a retaining ring 30 and a shade 32.

The projection lens 28 is disposed on an optical axis Ax that extends in the longitudinal direction of a vehicle (not shown). The projection lens 28 is a plane-convex lens which has a convex surface on the front and a flat surface on the back; and it projects an image, which is on a focal point surface including the rear focal point Fo of the projection lens 28, as an inverted image toward the front (or toward left in FIG. 3) of the lamp unit 20. More precisely, the optical axis Ax is set to extend downward toward the front of the lamp unit 20 by approximately 0.5 to 0.6 degrees with respect to the horizontal direction.

The discharge bulb 22 is a metal halide bulb; and it is composed of an arc tube unit 22A having a light emitting portion 22*a,* which emits light by discharging, and an insulation plug 22B fixedly supports the arc tube unit 22A. The discharge bulb 22 is inserted and fixed in the reflector 24 from, as seen from FIG. 4, the right side of the optical axis Ax in the position behind the rear focal point Fo of the projection lens 28 and is separated below from, as seen from FIG. 3, the optical axis Ax. In other words, the discharge bulb 22 is disposed at a point which is at a distance obliquely downward from the optical axis that passes through substantially the center of the reflector 22.

In this arrangement, the bulb shaft Ax1 of the discharge bulb 22 extends, as seen from FIG. 2, horizontally on an imaginary vertical plane that is perpendicular to the optical axis Ax of the projection lens 28. As shown in FIG. 1, the downward displacement amount L1 of the bulb shaft Ax1 with respect to the optical axis Ax is set to be approximately 20 mm (L=20 mm); and the rearward displacement amount L2 of the bulb shaft Ax1 with respect to the rear focal point Fo of the projection lens 28 is set to be approximately 30 mm (L=30 mm).

The discharge bulb 22 is fixedly inserted (or inserted and fixed) in the reflector 24 such that the light emitting portion 22*a* is positioned vertically below the optical axis Ax, as seen from FIGS. 2 and 3. A socket 40 for power supply is fitted to the insulation plug 22B of the discharge bulb 22 that is fixedly inserted in the reflector 24 in such a manner as described above.

The reflector 24 has a reflecting surface 24*a* that condenses and reflects light from the discharge bulb 22 to the front and toward the optical axis Ax. In the lower right side area of the reflecting surface 24*a,* a bulb insertion fixing portion 24*b,* having a shape that substantially the same as the insulation plug 22B and socket 40, is formed to project, as best seen from FIG. 2, from the reflecting surface 24*a.* In addition, a hole 24*c* for inserting the discharge bulb 22 is formed on the left side surface portion (or inner side) of the bulb insertion fixing portion 24*b*, in order to cause the arc tube unit 22A of the discharge bulb 22 to project toward the front of the reflecting surface 24*a* and to determine the position of the insulation plug 22B.

In the above description and in the following description, the "right" is on the right side of the optical axis Ax when the reflector 24 is viewed from behind, and the "left" is on the opposite side from the "right."

A plurality of brackets 24*d* are formed on the outer peripheral portion of the reflector 24. The lamp unit 20 is supported by the aiming mechanism 50 of the lamp body 14 of the headlamp 10 by these brackets 24*d*.

The lens holder 26 is a cylinder, and it extends from the front end opening portion of the reflector 24 toward the front (or toward left in FIGS. 3 and 4). The lens holder 26 is fixedly supported by the reflector 24 at its rear end portion and holds the projection lens 28 at its front end via the retaining ring 30

The shade 32 is integrated with the lens holder 26 on the inner peripheral side of the lens holder 26. In this shade 32, both right and left end portions are curved toward the front along the focal surface of the projection lens 28 with respect to a vertical plane that is perpendicular to the optical axis Ax at the rear focal point Fo of the projection lens 28. The upper edge 32*a* of the shade 32 is formed such that, as seen from FIG. 2, the portion on the left side of the optical axis Ax is horizontal, and the portion on the right side of the optical axis Ax is slanted obliquely downward from the optical axis Ax with respect to the horizontal direction. Thus, the shade 32 blocks part of light reflected from the reflecting surface 24*a* of the reflector 24, and a horizontal and an oblique cut-off lines are formed at an upper edge of a low beam distribution pattern as an inverted image of the upper edge 32*a* of the shade 32.

Figure 6:
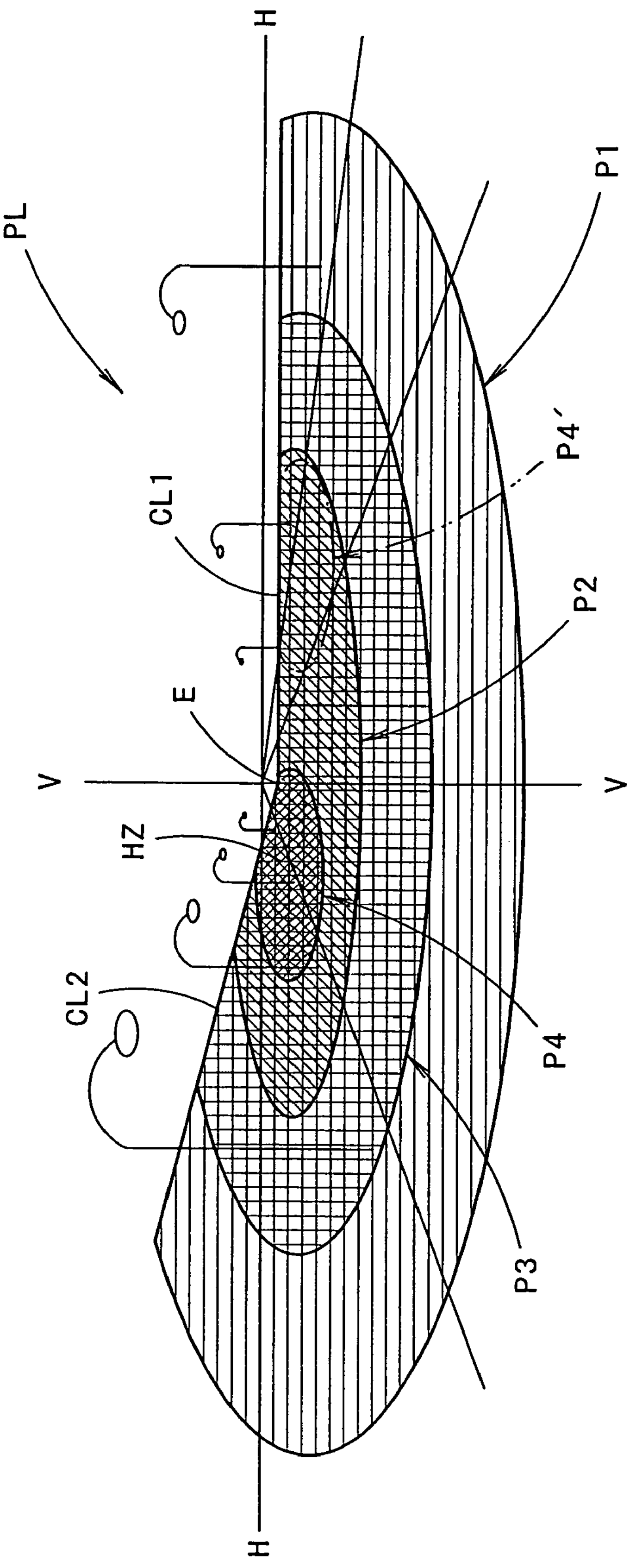
FIG. 6 illustrates the low beam distribution pattern formed by light radiation from the lamp unit, the pattern being on an imaginary vertical screen positioned 25 m in front of the headlamp.

FIG. 6 illustrates the low beam distribution pattern PL that is formed by light radiation from the lamp unit 20 on an imaginary vertical screen which is 25 m in front of the lamp 10.

As described above, the low beam distribution pattern PL shown in FIG. 6 is a left-side light distribution pattern that has at its upper edge a horizontal cut-off line CL1 and an oblique cut-off line CL2. The position of an elbow point E that is an intersection point of the two cut-off lines CL1 and CL2 is set to be approximately 0.5 to 0.6 degrees below the crossing point (a vanishing point H-V) of H—H and V—V lines in the directly forward direction of the lamp. In this low beam distribution pattern PL, a hot zone HZ that is a high-intensity light area is formed on the left side of the elbow point E.

More specifically, the low beam distribution pattern PL is formed as a combination light distribution pattern in which the following four light distribution patterns are superposed: a diffusion light distribution pattern P1 that diffuses to a great extent on both right and left sides of a vertical V—V line that passes through the vanishing point H-V, a condensed light distribution pattern P2 that diffuses to a small extent on both right and left sides of the V—V line, an intermediate light distribution pattern P3 that diffuses to a slightly greater extent than the condensed light distribution pattern P2 on both right and left sides of the V—V line, and a hot zone forming light distribution pattern P4 for forming a hot zone HZ.

Figure 5:
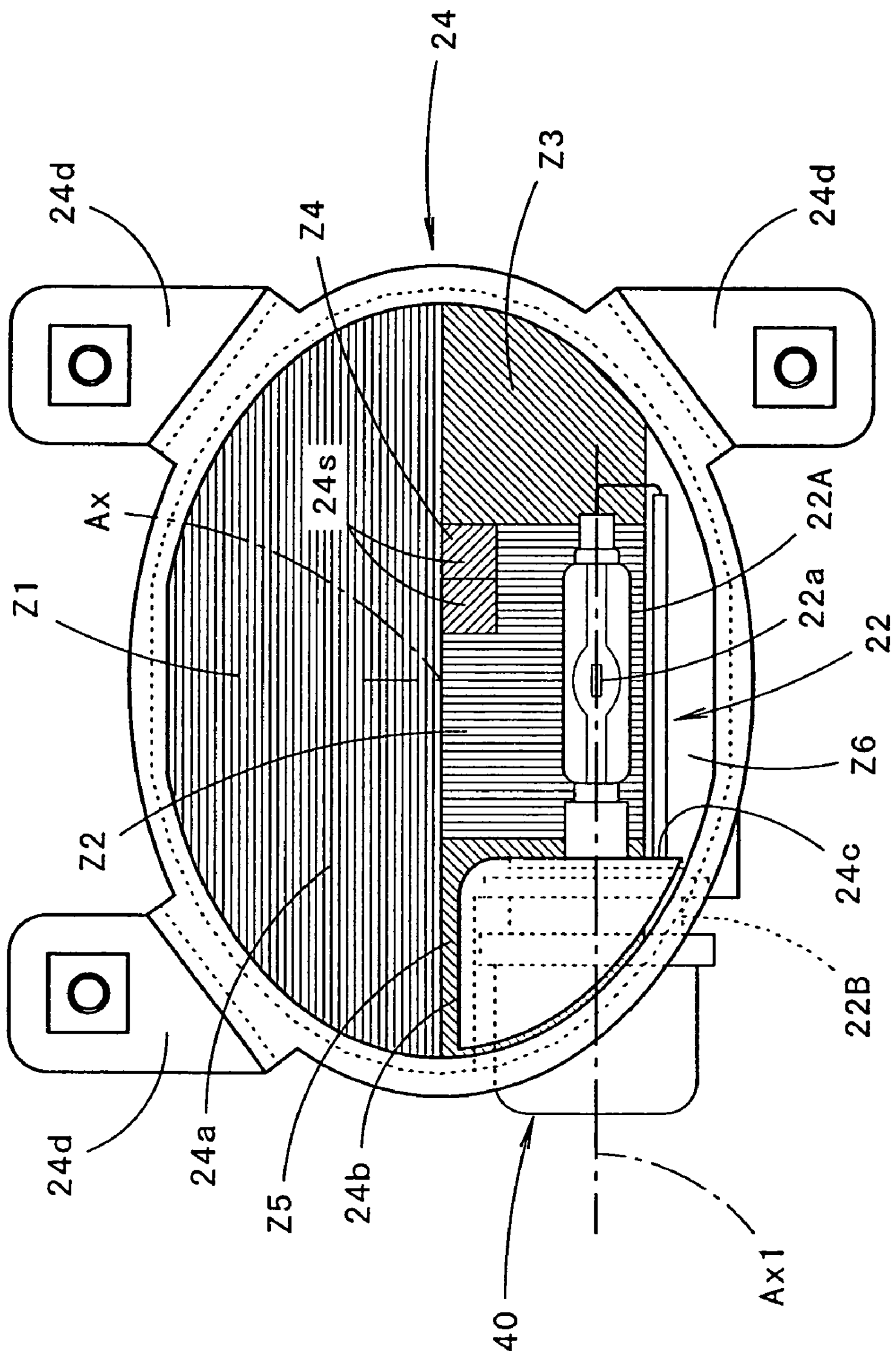
FIG. 5 is a front view of the reflector of the lamp unit with a discharge bulb fixedly inserted therein.

FIG. 5 shows the reflector 24 of the lamp unit 20 with the discharge bulb 22 fixedly inserted.

As seen from FIG. 5, the reflecting surface 24*a* of the reflector 24 has an upper reflection area Z1 which is positioned above the optical axis Ax. The upper reflection area Z1 forms the diffusion light distribution pattern P1. In addition, the reflecting surface 24*a* of the reflector 24 has a lower reflection area that is below the optical axis Ax; and this lower reflection area is formed with a lower central area Z2, which is a reflection area that forms the condensed light distribution pattern P2, and a lower left area Z3, which is a reflection area that forms the intermediate light distribution pattern P3. Furthermore, a top left corner area Z4 of the lower central area Z2 (the top left corner area Z4 is seen in the top right corner of the lower central area Z2 in FIG. 5) is formed as a reflection area that exclusively forms the hot zone forming light distribution pattern P4.

The upper reflection area Z1 and the lower central and left areas Z2 and Z3 in the lower reflection area are formed with smooth curved surfaces, respectively. On the other hand, the top left corner area Z4 of the lower central area Z2 is composed of two small curved surfaces 24*s* that are in a step pattern; therefore, the reflection direction of light from the discharge bulb 22 can be significantly changed.

In FIG. 6, the light distribution pattern P4' shown by chain double-dashed lines is a light distribution pattern that is formed by light reflected from the top left corner area Z4 in the event that the light reflection direction of the top left corner area Z4 is not changed and the light distribution pattern P4' has the same curve surface as other portions of the lower central area Z2. In other words, the light distribution pattern P4' would be formed if the top left corner area Z4 that has a step pattern was not formed in the reflector 24. In the shown embodiment, brightness of the hot zone HZ is sufficiently heightened, and the area in the lane of oncoming vehicles in the low beam distribution pattern PL is prevented from being brightened more than necessary by way of forming the top left corner area Z4 that has a step pattern and thus moving the light distribution pattern P4' to the position of the hot zone forming light distribution pattern P4.

Since the bulb insertion fixing portion 24*b* is formed in the lower right area Z5 of the lower reflection area of the reflecting surface 24*a* of the reflector 4, most of the lower right area Z5 is not used for controlling the distribution light. Therefore, the lower right area Z5 is set as a reflection area that forms in a supplementary fashion the intermediate light distribution pattern P3.

In addition, the lower edge vicinity area Z6 in the lower reflection area of the reflecting surface 24*a* is not used for controlling the distribution light because it is difficult to allow the reflection light in the lower edge vicinity area Z6 to be incident to the projection lens 28.

As described in detail above, the vehicular headlamp 10 of the present invention is configured so as to form the low beam distribution pattern PL by the light that is radiated from the projector-type lamp unit 20; and this discharge bulb 22, which is the light source bulb of the projector-type lamp unit 20, is fixedly inserted in the reflector 24 from the position that is below the optical axis Ax and at a distance from the optical axis Ax on one side (right side in the embodiment). Because of this structure, the vehicular headlamp 10 of the present invention has several advantages.

First, since the discharge bulb 22 is fixedly inserted in the reflector 24 from the side (from the right side in the shown embodiment) of the (optical axis Ax of the) projection lens 28, the longitudinal length of the lamp unit 20 can be reduced. In other words, as seen from FIG. 1, the rearward projection amount of the lamp unit 20 having the socket 40 fitted thereto is shorter by a dimension of L3 compared to that of the existing normal lamp unit 120 which is shown by the chain double-dashed lines.

Second, since the discharge bulb 22 is fixedly inserted in the reflector 24 at a position that is separated from or at a distance below the optical axis Ax of the projection lens 28, the hole 24*c* which is for receiving the light source bulb 22 is prevented from being formed on the side of the optical axis on the reflecting surface 24*a* of the reflector 24. Thus, an area of the reflecting surface 24*a* located on the side of the optical axis is effectively used for controlling the distribution light. As a result, it is possible to form a diffusion area of the low beam distribution pattern PL by light reflected from the side area of the optical axis, and sufficient brightness of the diffusion area can be ensured.

As seen from the above, according to the present invention, sufficient brightness of the diffusion area of the low beam distribution pattern PL that is formed by light radiation from the lamp unit 20 can be ensured with a reduced longitudinal length the projector-type lamp unit 20.

In the shown embodiment, the downward displacement amount of the bulb shaft Ax1 of the discharge bulb 22 with respect to the optical axis Ax of the projection lens 28 is set to be a relatively large value, approximately 20 mm. Accordingly, light from the discharge bulb 22 that is reflected in the optical axis vicinity area on the reflecting surface 24*a* of the reflector 24 is prevented from being blocked by the discharge bulb 22.

In addition, since in the shown embodiment the discharge bulb 22 is provided behind the shade 32 that is disposed between the projection lens 28 and the discharge bulb 22, it is possible to sufficiently utilize the upper reflection area Z1 that is suitable for forming the low beam distribution pattern PL.

Furthermore, in the shown embodiment, the upper reflection area Z1, which is located above the optical axis Ax on the reflecting surface 24*a* of the reflector 24, forms the diffusion light distribution pattern P1. Accordingly, it is possible to provide the low beam distribution pattern PL with a sufficient lateral diffusion angle. In addition, in the lower reflection area that is located below the optical axis Ax on the reflecting surface 24*a* of the reflector 24, the lower central area Z2, in which the value of the incident flux of the discharge bulb 22 is relatively large, is set to form the condensed light distribution pattern P2. Thus, it is possible to easily form the hot zone HZ that is the area of high-intensity light in the low beam distribution pattern PL.

Particularly in the shown embodiment, since the top left corner area Z4 of the lower central area Z2 makes a reflection area used exclusively for forming the hot zone forming light distribution pattern P4, it is furthermore easy to form the hot zone HZ. In addition, since the light distribution pattern P4' in the low beam distribution pattern PL that should form in the lane of oncoming vehicles is moved to the position of the hot zone forming light distribution pattern P4, an area in the lane of oncoming vehicles in the low beam distribution pattern PL is prevented from being brightened more than necessary and to sufficiently heighten the brightness of the hot zone HZ.

Further, in the present invention, the light emitting portion 22*a* of the discharge bulb 22 is positioned so as to extend in the lateral direction, the image of the light emitting portion 22*a* that is formed on the imaginary vertical screen by light reflected from the reflecting surface 24*a* of the reflector 24 can be formed as a horizontally oblong image. Therefore, even if the low beam distribution pattern PL appears to have a large lateral diffusion angle, luminescent unevenness is less likely to generate. Moreover, since the image of the light emitting portion 22*a* forms in a horizontally oblong shape, the hot zone HZ can be formed without excessive vertical width. Thus, an area in the close distance to the road surface in front of the vehicle is prevented from being brightened more than necessary, and the visibility at a far distance location can improve.

In the shown embodiment, the downward displacement amount L1 of the bulb shaft Ax1 of the discharge bulb 22 with respect to the optical axis Ax of the projection lens 28 is set to be approximately 20 mm, and the rearward displacement amount L2 with respect to the rear focal point Fo of the projection lens 28 is set to be approximately 30 mm. However, needless to say, it is possible to employ values other than those specified above for the downward displacement amount L1 and for the rearward displacement amount L2.

A modification of the above embodiment will be described below with reference to FIG. 7 that shows the discharge bulb 22 fixedly inserted in the reflector 64.

Figure 7:
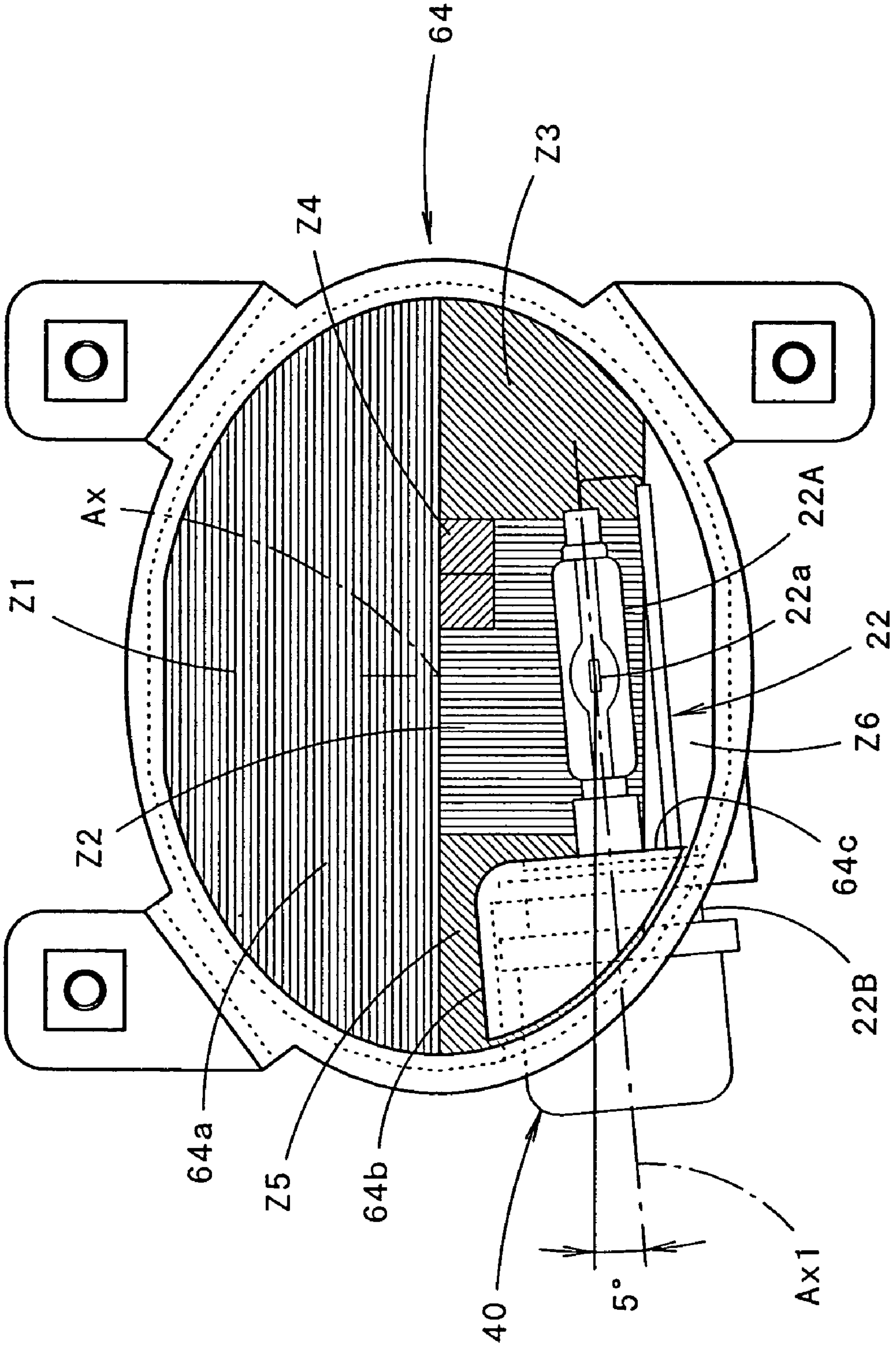
FIG. 7 is a front view of another reflector of the lamp unit of the present invention with a discharge bulb fixedly inserted therein.

The reflector 64 of the modification of FIG. 7 has the same basic configuration as that of the reflector 24 of the above-described embodiment; however, the angle of fixedly inserting the discharge bulb 22 differs from the embodiment described above.

More specifically, in the embodiment described above, the discharge bulb 22 is fixedly inserted in the reflector 24 so that the bulb shaft Ax1 of the discharge bulb 22 is set horizontally. In the modification of FIG. 7, the discharge bulb 22 is fixedly inserted in the reflector 64 so that the bulb shaft Ax1 of the discharge bulb 22 is inclined upward by 5 degrees with respect to the horizontal direction (so that the tip end of the discharge bulb 22 is higher than the other end). The light emitting portion 22*a* is positioned at a distance vertically below the optical axis Ax by approximately 20 mm in the same way as in the above-described embodiment.

With the structure of the modification shown above, a hole 64*c* for fixedly inserting the discharge bulb 22 and a bulb insertion fixing portion 64*b* that are formed in the reflecting surface 64*a* of the reflector 64 can be formed at a position lower than the structure of the above embodiment. Accordingly, the portion of the reflecting surface 64*a* that is on the side of the optical axis Ax can be more widely used for controlling the distribution light.

In addition, in the show modification, the upward inclined angle of the discharge bulb 22 is 5 degrees. Needless to say, it is possible to have values other than the one specified above. However, if the bulb shaft Ax1 is significantly inclined with respect to the horizontal direction, it is difficult for the discharge bulb 22 to discharge light normally. Therefore, it is preferable to set the value of the upward inclined angle of the discharge bulb 22 to approximately 15 degrees or less.

Instead of providing the discharge bulb 22 obliquely in the modification, the discharge bulb 22 can be installed so that its bulb shaft Ax1 is inclined forward. With this forwardly inclined setting, the side area of the optical axis on the reflecting surface 64*a* can be further widely used for controlling the light distribution. The bulb shaft Ax1 of the discharge bulb 22, furthermore, can be set in an upward and forward inclined state. With this setting, the side area of the optical axis on the reflecting surface 64*a* can be used still further widely for controlling the distribution light.

What is claimed is:

1. A vehicular headlamp including a projector-type lamp unit which radiates light that forms predtermined light distribution pattern, said projector type lamp unit comprising a projection lens disposed on an optical axis that extends in a longitudinal direction of a vehicle, a light source bulb provided behind a rear focal point of said projection lens, and a reflector that condenses and reflects light from said light source bulb toward said optical axis in a forward direction, wherein said light source bulb is fixedly inserted in said reflector from one side of said optical axis in a position separated from said optical axis in a vertical direction;

a shade is provided between said projection lens and said light source bulb, said shade forming a cut-off line at an upper edge of said light distribution pattern by blocking part of light reflected from said reflector;

said upper reflection area forms a diffusion light distribution pattern, a lower central area of said lower reflection area forms a condensed light distribution pattern;

said light source bulb is fixedly inserted in said reflector from below said optical axis; and said light source bulb is provided in said reflector so that said light source bulb is upwardly inclined by a predetermined angle with respect to a horizontal direction.

2. The vehicular headlamp according to claim 1, wherein a vertical displacement amount of a light emitting portion of said light source bulb from said optical axis is set to be 10 mm or more.

3. The vehicular headlamp according to claim 1, wherein a reflecting surface of said reflector is comprised of an upper reflection area and a lower reflection area, and wherein:

said upper reflection area forms a diffusion light distribution pattern, and a lower central area of said lower reflection area forms a condensed light distribution pattern.

4. The vehicular headlamp according to claim 1, wherein a vertical displacement amount of a light emitting portion of said light source bulb from said optical axis is set to be 10 mm or more.

* * * * *